United States Patent [19]
Date et al.

[11] Patent Number: 5,825,450
[45] Date of Patent: *Oct. 20, 1998

[54] LIQUID CRYSTAL DISPLAY DEVICE

[75] Inventors: Takashi Date; Manabu Kusano, both of Fukushima-ken, Japan

[73] Assignee: Alps Electric Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 881,786

[22] Filed: Jun. 24, 1997

[51] Int. Cl.$^6$ ................................. G02F 1/1335
[52] U.S. Cl. ........................... 349/149; 349/152
[58] Field of Search ................... 349/145, 149, 349/148, 152

[56] References Cited

U.S. PATENT DOCUMENTS

| | | | |
|---|---|---|---|
| 5,283,677 | 2/1994 | Sagawa et al. | 359/88 |
| 5,621,554 | 4/1997 | Kuniyori | 349/149 |
| 5,657,104 | 8/1997 | Kanezawa | 349/149 |

FOREIGN PATENT DOCUMENTS

| | | | |
|---|---|---|---|
| 629895A2 | 12/1994 | European Pat. Off. | 349/145 |
| 3-29925 | 2/1991 | Japan | 349/145 |
| 6-67191 | 3/1994 | Japan | 349/149 |
| 94/24604 | 10/1994 | WIPO | 349/149 |

*Primary Examiner*—Anita Pellman Gross
*Assistant Examiner*—Tiep Nguyen
*Attorney, Agent, or Firm*—Brinks Hofer Gilson & Lione

[57] ABSTRACT

A liquid crystal display device includes a display pattern portion including a plurality of transparent electrodes extending mutually in parallel, a terminal portion including a plurality of lead patterns extending mutually in parallel with a pattern pitch narrower than that among the transparent electrodes, and connection patterns for connecting the transparent electrodes and the lead patterns. The connection patterns consist of first connection patterns leading obliquely from the transparent electrodes to extend mutually in parallel and having a common pattern width, and second connection patterns leading straight from the lead patterns to connect with the first connection patterns at a predetermined angle and having a common pattern width. In addition, the liquid crystal display device has the following relationship:

$$Amax/Bmax = Wa/Wb$$

where Amax represents a length of the longest first connection pattern, Wa represents the pattern width thereof, Bmax represents the length of the longest second connection pattern, and Wb represents the pattern width thereof.

1 Claim, 3 Drawing Sheets

LIQUID CRYSTAL DISPLAY DEVICE

BACKGROUND OF THE INVENTION

1. Field of the Invention

The present invention relates to liquid crystal display devices, and in particular to improvement of connection patterns for connecting a display pattern portion including transparent electrodes and a terminal portion including lead patterns.

2. Description of the Related Art

Conventional liquid crystal display devices use an interconnection pattern in which a plurality of transparent electrodes in a display region extending mutually in parallel, a plurality of lead patterns leading from the transparent electrodes to the periphery of a cell substrate, and so forth are formed on the cell substrate. Accordingly, in general, a pattern pitch among the lead patterns used as terminals is narrower than that among the transparent electrodes.

FIG. 3 illustrates a conventional example of the above type of interconnection pattern. The interconnection pattern chiefly includes a display pattern portion 1 including a plurality of transparent electrodes 2 extending mutually in parallel, a terminal portion 3 including a plurality of lead patterns 4 extending mutually in parallel with a pattern pitch narrower than that among the transparent electrodes 2, and connection patterns 5 for connecting the transparent electrodes 2 and the lead patterns 4. The transparent electrodes 2 and the lead patterns 4 which have different pattern pitches are connected by slightly changing the lengths and inclinations of the respective connection patterns 5.

In order that the liquid crystal display device can avoid irregularity in brightness and color, the electrical resistances between the transparent electrodes 2 and the lead patterns 4 for the respective connection patterns 5 need to be determined not to have different values. Accordingly, in the related art, in order to set the resistances of the respective connection patterns 5 to equal values, the connection patterns 5 are designed so that the longer connection pattern 5 has a wider pattern width. However, it is not easy for designers to calculate the pattern widths of as many as several hundreds of connection patterns 5 and designate the calculations on a blueprint or the like. The designated specifications are also complicated for personnel at a pattern production site.

In addition, the conventional interconnection pattern shown in FIG. 3 has a disadvantage in which pattern pitches among the upper connection patterns 5 having large angles of inclination with respect to the lead patterns 4 are smaller than a narrow pattern pitch among the lead patterns 4, and the upper connection patterns 5 have pattern widths wider than the lower connection patterns 5 having small angles of inclination because the upper connection patterns 5 are longer than the lower connection patterns 5, thus, the adjacent distance between the connection patterns 5 having large angles of inclination becomes extremely narrow to easily cause short-circuiting.

SUMMARY OF THE INVENTION

Accordingly, it is an object of the present invention to provide a liquid crystal display device in which design and production for equalizing the resistances of a plurality of connection patterns can be easily performed without calculating the pattern widths of the plurality of connection patterns, and a highly reliable layout formed so as not to locally narrow the distance between the adjacent connection patterns is realized.

To this end, the foregoing object has been achieved through the provision of a liquid crystal display device provided with a display pattern portion comprising a plurality of transparent electrodes extending mutually in parallel, a terminal portion comprising a plurality of lead patterns extending mutually in parallel with a pattern pitch narrower than that among the transparent electrodes, and connection patterns for connecting the transparent electrodes and the lead patterns are included, wherein the connection patterns consist of first connection patterns leading obliquely from the transparent electrodes to extend mutually in parallel and having a common pattern width, and second connection patterns leading straight from the lead patterns to connect with the first connection patterns at a predetermined angle and having a common pattern width, and the liquid crystal display device has the following relationship:

$$Amax/Bmax = Wa/Wb$$

where Amax represents the length of the longest first connection pattern, Wa represents the pattern width thereof, Bmax represents the length of the longest second connection pattern, and Wb represents the pattern width thereof.

According to a liquid crystal display device of the present invention, the essential setting operation of equalizing the resistances of a plurality of connection patterns in order to avoid display irregularity can be easily performed. Thus, the use of the connection patterns reduce burdens to designers and personnel at a pattern production site, compared with the use of conventional connection patterns.

In addition, the present invention provides a layout formed so as not to locally narrow the distance between the adjacent connection patterns, which enables design to avoid short-circuiting among the connection patterns.

DESCRIPTION OF THE PREFERRED EMBODIMENT

Figure 1:
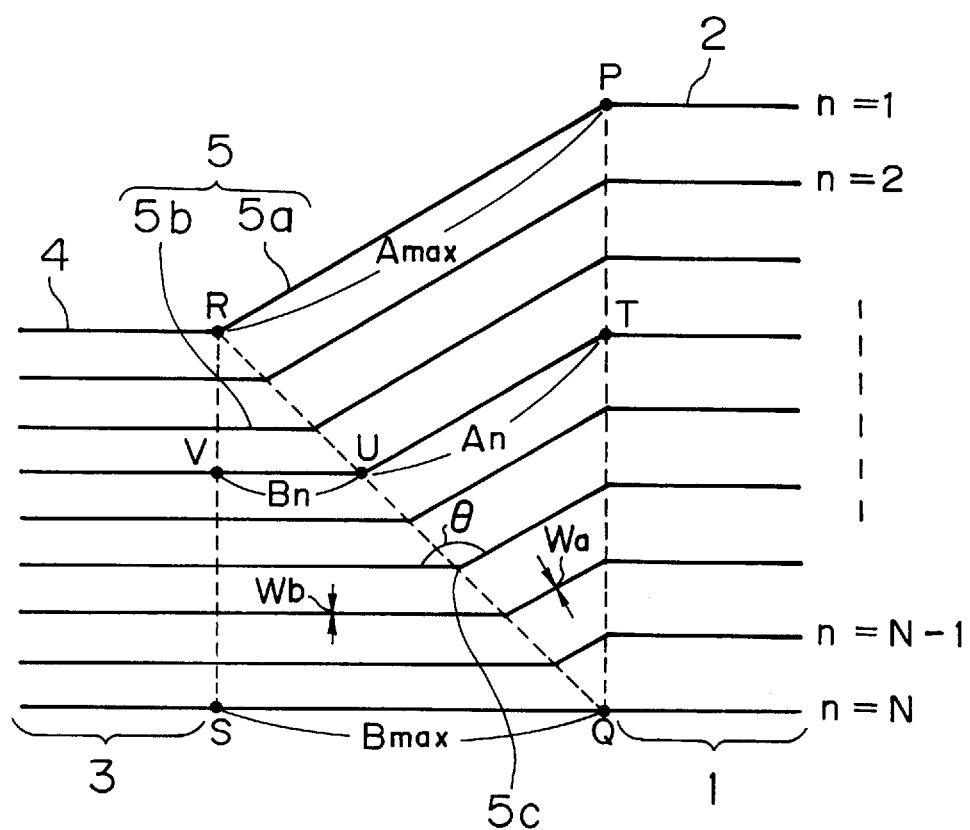
FIG. 1 is a chart illustrating an interconnection pattern used in a liquid crystal display device according to an embodiment of the present invention.
Figure 2:
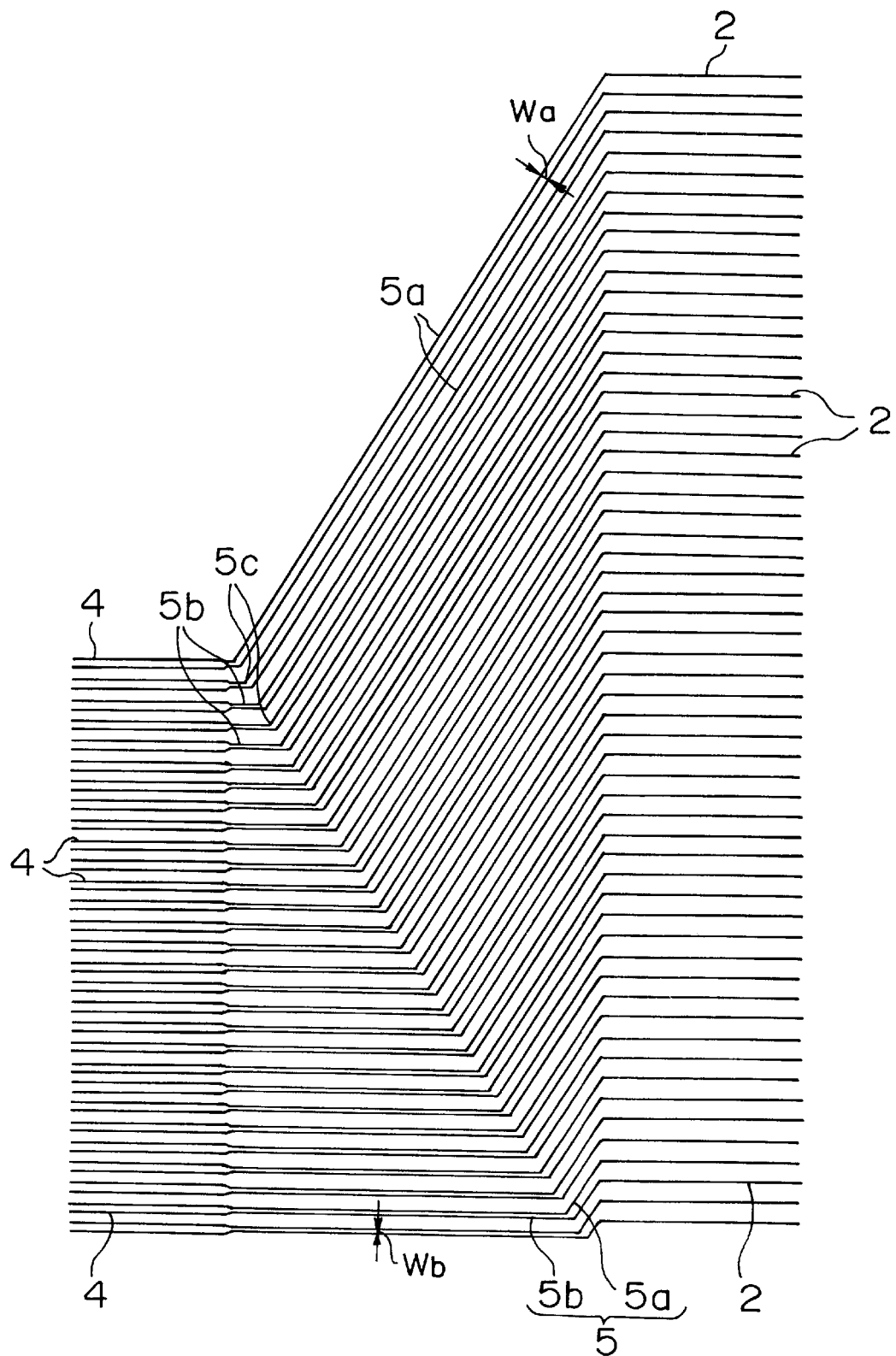
FIG. 2 is a schematic plan view showing the interconnection pattern shown in FIG. 1.
Figure 3:
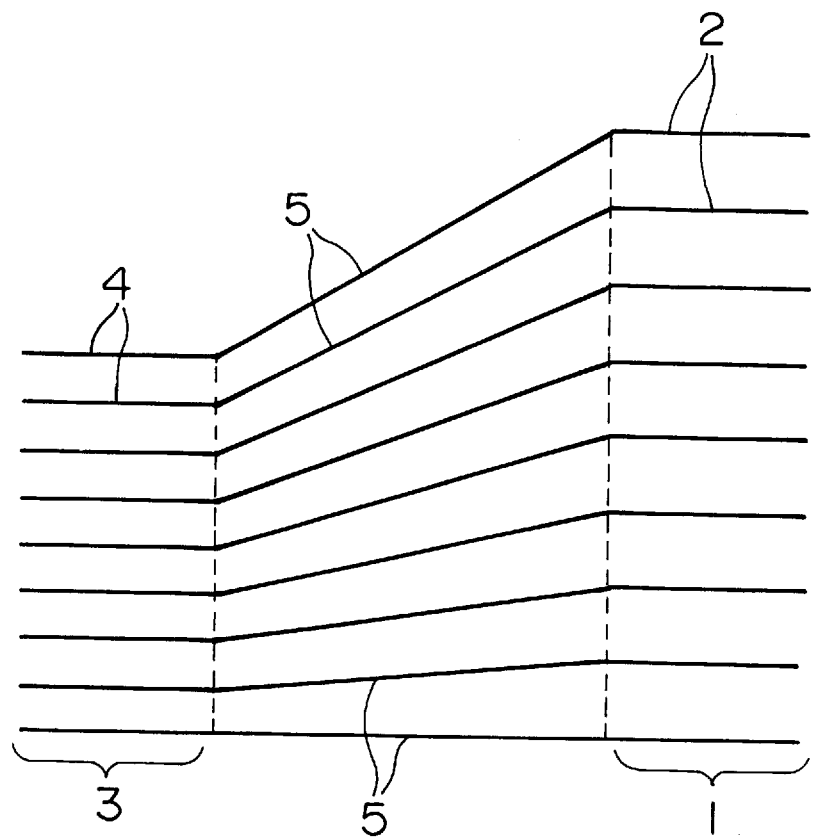
FIG. 3 is a chart illustrating an interconnection pattern used in a liquid crystal display device according to related art.

One embodiment of the present invention will be described with reference to the attached drawings. FIG. 1 illustrates an interconnection pattern used in a liquid crystal display device according to the embodiment. FIG. 2 shows a schematic plan view of the interconnection pattern shown in FIG. 1. Components corresponding to those shown in FIG. 3 illustrating the related art are denoted by identical reference numerals.

The interconnection pattern shown in FIGS. 1 and 2 chiefly includes a display pattern portion 1 including a plurality of transparent electrodes 2 which extend mutually in parallel, a terminal portion 3 including a plurality of lead patterns 4 which have a pitch narrower than that among the transparent electrodes 2 and extend mutually in parallel, and connection patterns 5 for connecting the transparent electrodes 2 and the lead patterns 4. These connection patterns 5 consist of first connection patterns 5a which lead obliquely from the transparent electrodes 2 to extend mutually in parallel and have a common pattern width Wa, and second connection patterns 5b which lead straight from the lead patterns 4 to connect with the first connection patterns 5a at a predetermined angle θ and have a common pattern width Wb. Concerning the first and second connection patterns 5a and 5b, the pattern widths Wa and Wb are determined so as to satisfy the following equation:

$$Amax/Bmax=Wa/Wb$$

where Amax represents the length of the longest first connection pattern 5a, and Bmax represents the length of the longest second connection pattern 5b. Thus, the resistances of connection patterns 5 consisting of the first connection pattern 5a and the continuous second connection pattern 5b are equal.

In other words, when N first connection patterns 5a in total are connected to the corresponding second connection patterns 5b to form the connection patterns 5, let the length of the n-th first connection pattern 5a from the longest first connection pattern 5a be An, the length of the continuous second connection pattern be Bn, and area resistance be ρ. The resistance of one connection pattern 5 formed by connecting the n-th first and second connection patterns 5a and 5b is expressed as $$\rho(An/Wa)+\rho(Bn/Wb)$$

At the same time, the first connection patterns 5a and the second connection patterns 5b (both parallel patterns) are connected at the predetermined angle θ. In addition, the corresponding sides of mutually similar triangles ΔPQR and ΔTQU shown in FIG. 1 are at constant ratios, and the corresponding sides of mutually similar triangles ΔQRS and ΔURV are also at constant ratios. Hence, the following relationship:

$$TU/PR=UQ/RQ=1-(RU/RQ)=1-(UV/QS)$$

has been established among the side lengths of the triangles.

From the above relationship, an expression for the relation $$An/Amax=1-(Bn/Bmax)$$

is obtained. Thus, $$An/Wa=(Amax/Wa)-(Amax\cdot Bn/Bmax\cdot Wa)$$

By replacing Amax/Bmax in this expression with Wa/Wb using the aforementioned conditions, $$(An/Wa)+(Bn/Wb)=Amax/Wa$$

is given. As is apparent from FIG. 1, An where n=1, namely, A1 is Amax, and Bn where n=N, namely, BN is Bmax.

Consequently, the resistance of one connection pattern 5 formed by connecting the n-th first and second connection patterns 5a and 5b is expressed as $$\rho(An/Wa)+\rho(Bn/Wb)=\rho(Amax/Wa) \text{ or } \rho(Bmax/Wb)$$

The resistance does not depend on the number n. In other words, the resistances of N connection patterns 5 are set to the same value.

As described above, in this embodiment, according to a basic layout in which the first connection patterns 5a and the second connection patterns 5b are connected at a desired angle θ in accordance with the space between the transparent electrodes 2 and the lead patterns 4 by only calculating the common pattern width Wa of the first connection patterns 5a and the common pattern width Wb of the second connection patterns 5b, the essential setting operation of setting the resistances of the connection patterns 5 to the same value in order to avoid display irregularity is easily performed without a complicated measuring of the respective pattern widths of the N (amounting to as many as several hundred) connection patterns 5. Therefore, the use of the connection patterns reduces burden on designers and personnel at a pattern production site, compared to the use of conventional connection patterns.

The connection patterns 5 in this embodiment have a pattern shape in which bending points 5c where the first connection patterns 5a and the second connection patterns 5b are connected at the angle θ are arranged along a non-perpendicular line with respect to the lead patterns 4. In addition, the distance between the adjacent bending points 5c is wider than the pattern pitch among the second connection patterns 5b. Thus, this arrangement provides an advantage in which the first connection patterns 5a extending obliquely to the transparent electrodes 2 from the second connection patterns 5b having the same pitch as the lead patterns 4 do not need to be formed with a relatively narrow pattern pitch. In the above manner the connection patterns 5 consisting of the first and second connection patterns 5a and 5b reasonably employ a layout in which the distance between the adjacent connection patterns 5 is not locally narrow, in other words, a layout in which short-circuiting hardly occurs. Therefore, the above-described arrangement is advantageous for improvement of reliability.

In the above-described embodiment the transparent electrodes 2 and the lead patterns 4 extend in the same direction. However, if the lead patterns 4 extend obliquely with respect to the transparent electrodes 2, it need hardly be said that the present invention can be applied without any change because the connection patterns 5 connecting both patterns may consist of first and second connection patterns 5a and 5b in which the angle θ of the bending points C is changed.

What is claimed is:

1. A liquid crystal display device provided with a display pattern portion comprising a plurality of transparent electrodes extending mutually in parallel, a terminal portion comprising a plurality of lead patterns extending mutually in parallel with a pattern pitch narrower than that among said transparent electrodes, and connection patterns for connecting said transparent electrodes and said lead patterns, in which said connection patterns consist of first connection patterns leading obliquely from said transparent electrodes to extend mutually in parallel, said first connection patterns having a common pattern width, and second connection patterns leading straight from said lead patterns to connect with said first connection patterns at a predetermined angle, said second connection patterns having a common pattern width, and said liquid crystal display device has the following relationship:

$$Amax/Bmax=Wa/Wb$$

where Amax represents a length of the longest first connection pattern, Wa, a pattern width thereof; Bmax, a length of the longest second connection pattern, and Wb, a pattern width thereof.

* * * * *